United States Patent [19]

Wiesemann

[11] Patent Number: 4,812,231
[45] Date of Patent: Mar. 14, 1989

[54] SELF CLEANING ROTATING FINE POLISHING FILTER SCREEN APPARATUS

[75] Inventor: Bruce O. Wiesemann, South Pasadena, Fla.

[73] Assignee: Wieseman Enterprises, Inc., Largo, Fla.

[21] Appl. No.: 233,290

[22] Filed: Aug. 17, 1988

[51] Int. Cl.⁴ ............................................. B01D 33/04
[52] U.S. Cl. ..................................... 210/158; 209/307; 209/380; 209/392; 210/159; 210/160; 210/400
[58] Field of Search ............... 210/158, 159, 160, 161, 210/400; 198/495,851; 209/307, 380, 392

[56] References Cited

U.S. PATENT DOCUMENTS

| 658,196 | 9/1900 | Whitney | 210/158 |
| 677,567 | 7/1901 | Freeman | 210/160 |
| 1,194,250 | 8/1916 | Smits | 210/158 |
| 1,716,376 | 6/1929 | Geiger | 210/158 |
| 2,525,516 | 10/1950 | Bergmann et al. | 210/158 |
| 2,653,521 | 9/1953 | Ahlfors | 210/392 |
| 2,804,209 | 8/1957 | Carlton et al. | 210/158 |
| 4,198,299 | 4/1980 | Ewing et al. | 210/77 |
| 4,447,324 | 5/1984 | Jackson | 210/159 |
| 4,518,494 | 5/1985 | Jackson | 210/158 |
| 4,597,864 | 7/1986 | Wiesemann | 210/160 |

Primary Examiner—Richard V. Fisher
Assistant Examiner—Matthew O. Savage
Attorney, Agent, or Firm—Herbert W. Larson

[57] ABSTRACT

An apparatus is described which separates small solids from process waste water. A continuously rotating elongated drum screen in a three foot diameter flow channel removes the solids. The solids are deposited by spray wash into a dewatering chamber. The screen components include row of closely spaced links and pivot members connected end-to-end to form a continuous loop mounted within a frame driven by a variable speed motor.

9 Claims, 6 Drawing Sheets

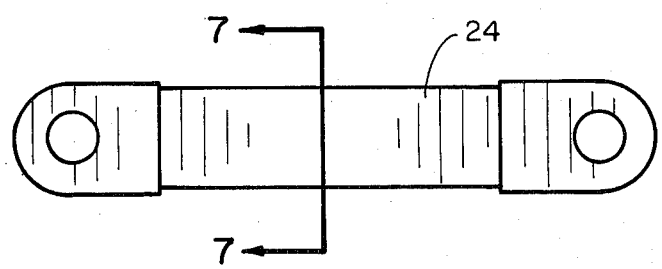
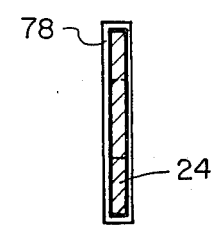
FIG. 6　　　　　FIG. 7
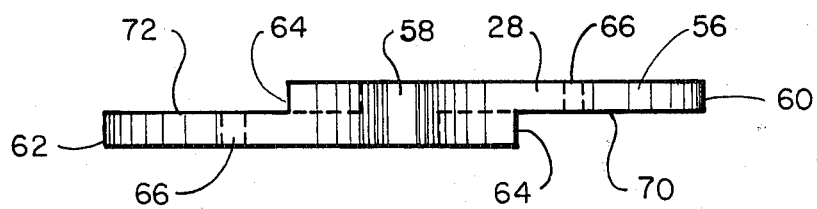
FIG. 8
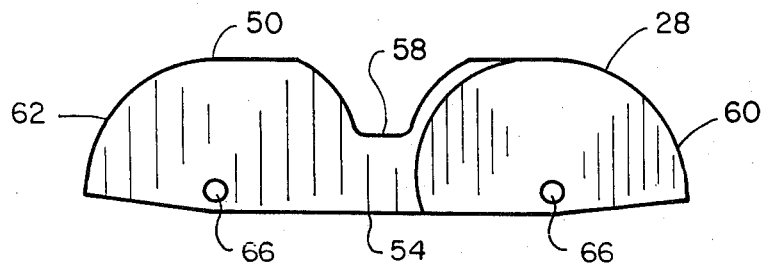
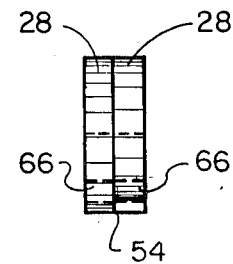
FIG. 9　　　　　FIG. 10

SELF CLEANING ROTATING FINE POLISHING FILTER SCREEN APPARATUS

BACKGROUND OF THE INVENTION

1. Field of the Invention

This invention relates to an apparatus for filtering particles from water. More particularly, it refers to an apparatus designed to remove algae and other larger than 0.5 mm debris from a water effluent line.

2. Description of the Prior Art

Traditionally, sand filter beds have been used to remove microscopic materials such as algae from a water effluent line. Such sand beds need to be back flushed frequently. In some large systems, back flushing must be carried out every two hours and an attendant's presence is needed to shut down the system and turn the necessary valves for the back flushing process. This is labor intensive and extremely costly.

The prior art apparatus for removing large size debris from water is replete with many different apparatus. A sample of those known are as follows;

U.S. Pat. No. 658,196 describes an endless screen for a waterway.

U.S. Pat. No. 1,194,250 describes a plurality of screen sections mounted on an endless chain. A spray wash on top of the screen deposits entrapped debris in a hopper.

U.S Pat. No. 1,716,376 describes an endless rotating screen wherein debris is scoured off the screen by water under pressure. The debris is carried off by a conveyor U.S. Pat. No. 2,525,516 describes a standardized drive mechanism for traveling water intake screens.

U.S. Pat. No. 2,653,521 describes a straining apparatus for paper pulp having an aperture rotating drum. A sprinkle tube 41 jets water to discharge debris from the strainer.

U.S. Pat. No. 2,804,209 describes a fish removal mechanism for traveling water intake screens. Spray water is directed into each pan 51 to flush out the fish.

U.S. Pat. No. 4,447,324 describes a revolving drum endless screen moved by vertical sprockets. A jet of sprayed fluid removes deposited debris from the downstream face of the screen. A trough carries off the debris.

U.S. Pat. No. 4,518,494 describes an industrial water intake endless screen. A spray nozzle directs a water spray onto the revolving screen surface to direct debris to a recovery channel.

U.S. Pat. No. 4,597,864 is directed to an apparatus employing a plurality of loops to form a screen assembly to lift debris from a water borne stream to a position from which the debris may be separated using a doctor blade. The loops in this patent are made up of a plurality of L-shaped link members disposed end to end in articulated relation to one another.

Although the apparatus in the prior art is useful in removing larger size particles from a wastewater stream and the sand filter system is useful in removing microscopic debris such as algae from a wastewater system, there is no effective system at the present time which can filter algae or other smaller particles found in a water effluent system, without the necessity for back flushing. The development of an apparatus to filter particles of 0.5 mm without needing a sand filter system would advance the state of the water filtration art.

SUMMARY OF THE INVENTION

I have found that the use of closely spaced links, connected in an end-to-end relationship to one another to form a continuous loop screen assembly in a self cleaning, rotating filter apparatus can be used to remove microscopic algae bio-mass from wastewater effluents efficiently and with reduced need for standby manpower.

My apparatus employs a drum type filter chamber having suspended therein a continuous loop of closely spaced link members. Multiple endless loop filter sections are disposed laterally and each section is spaced from each other section by a gear tooth engaging pivot member. The multiple endless loop filter sections are driven by a bank of gears engaging the gear tooth receiving pivot members and driving the screen assembly in an elliptical path along the internal sides, bottom and top of the drum chamber. The front end of the drum is open to allow the water effluent to flow into the drum chamber. The effluent moves out through the sides and bottom of the drum chamber after passing between the links. A back baffle in the drum chamber prevents water from flowing through the chamber. The screen assembly is driven by a variable speed motor. The motor drives a shaft which in turn drives the gears mounted in the top portion of the drum chamber. Gear teeth engage the pivot member capping each section of loop members. The screen assembly continues to move in an elliptical path. As the screen assembly reaches its top or overhead position, a water wash automatically flushes the top of the loops. The debris caught between the loop links drop into a first hopper and then into a compactor by gravity. The compactor, using a helical gears, removes most of the water and ejects the solid bio-mass into a second hopper for disposal.

The link members can be coated with an synthetic coating to promote removal of the bio-mass from the links at the top of the drum chamber. The invention provides for removal of minute particles in a continuous process and eliminates the requirement of using sand filters to finely polish a water effluent stream.

BRIEF DESCRIPTION OF THE DRAWINGS

The invention may be best understood by those having ordinary skill in the art by reference to the following detailed description when considered in conjunction with the accompanying drawings in which;

FIG. 6 is an elevation view of an individual link.

FIG. 7 is a front view of a link.

FIG. 8 is a top plan view of a pair of pivot members.

FIG. 9 is a front elevation view of a pivot member.

FIG. 10 is a front view of a pair of pivot members in cooperative engagement.

DETAILED DESCRIPTION OF THE INVENTION

Figure 1:
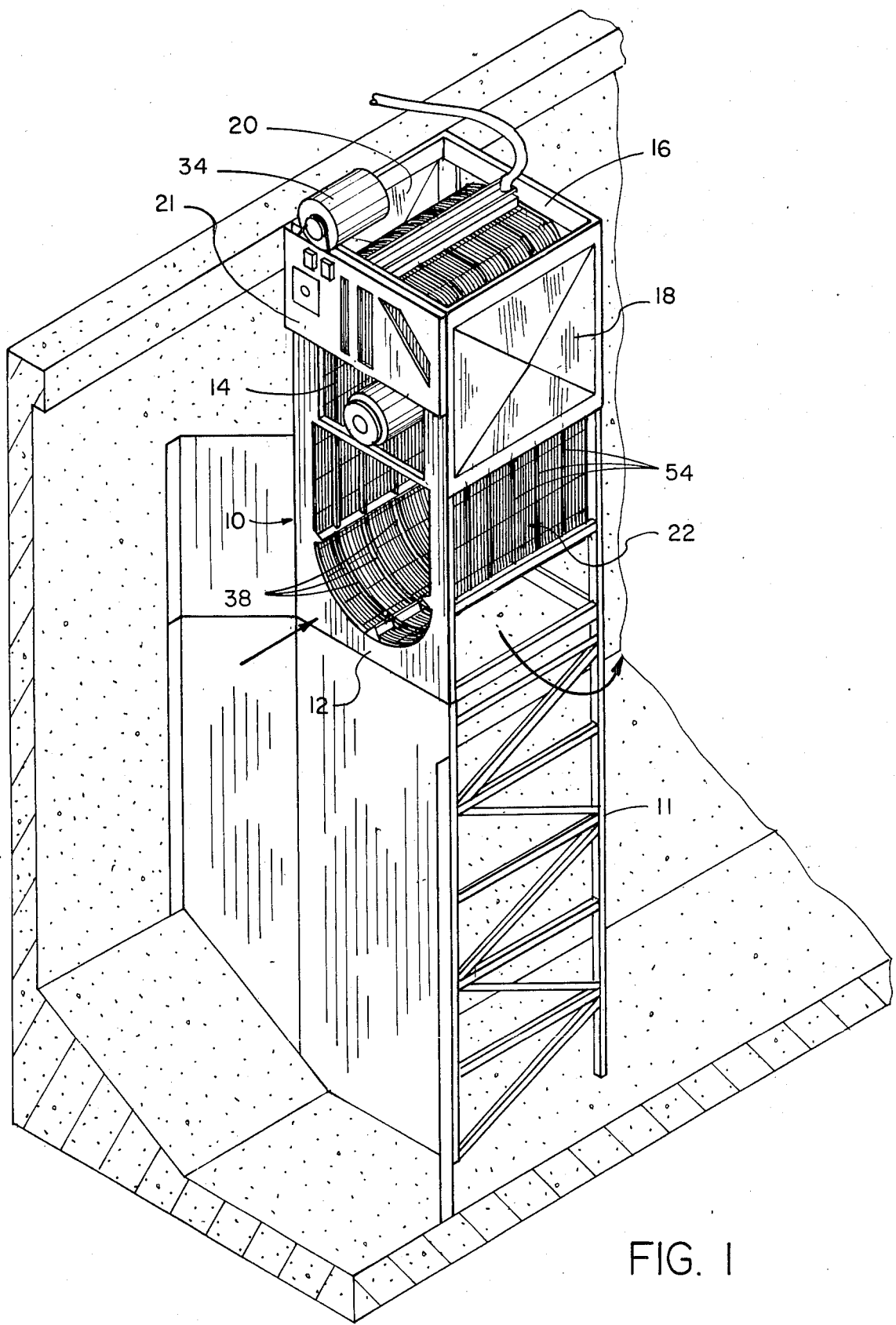
FIG. 1 is a perspective view of the drum chamber and filter apparatus positioned in a water effluent stream.

Throughout the following detailed description, the same reference numerals refer to the same elements in all figures. Referring to FIG. 1, the drum housing 10 is mounted on an elevated structure 11. The housing 10 has a partially open front end 12 leading to an inner chamber 14, and a rear baffle wall 16. Side walls 18 and 20 cover the top portion 21 of the drum chamber 14. The lower sides and bottom of drum chamber 14 are open to allow for water to drop from the chamber 14 by gravity.

Figure 4:
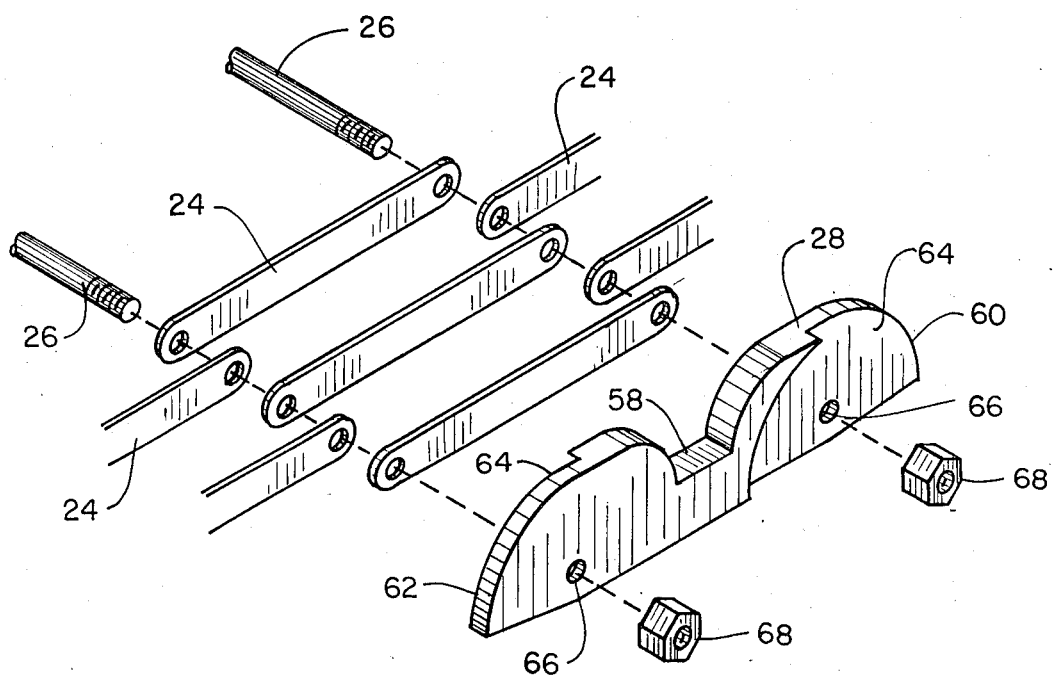
FIG. 4 is an exploded view of the links, the pivot member and its mounting rods.
Figure 5:
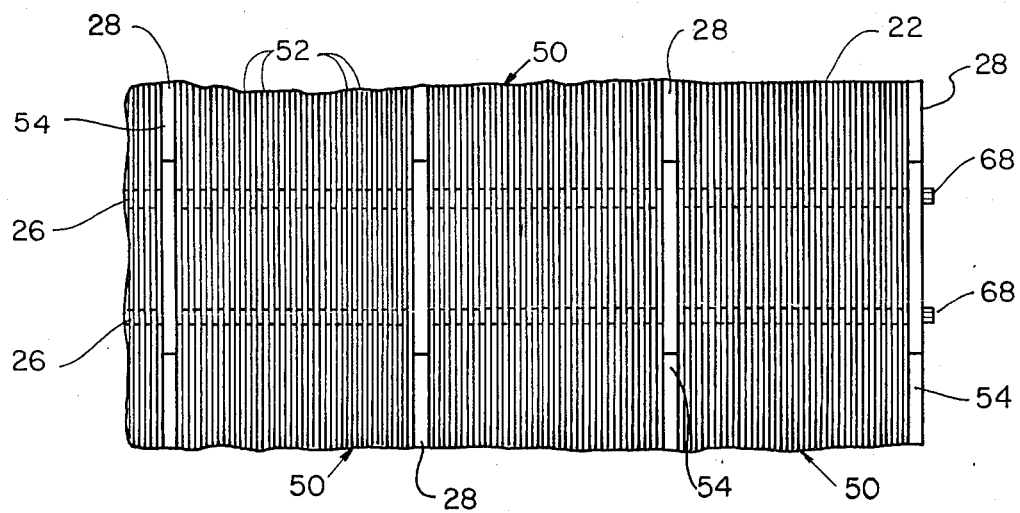
FIG. 5 is an elevation view of a portion of the loop assembly showing three loop sections mounted within the interior of the drum chamber.
Figure 11:
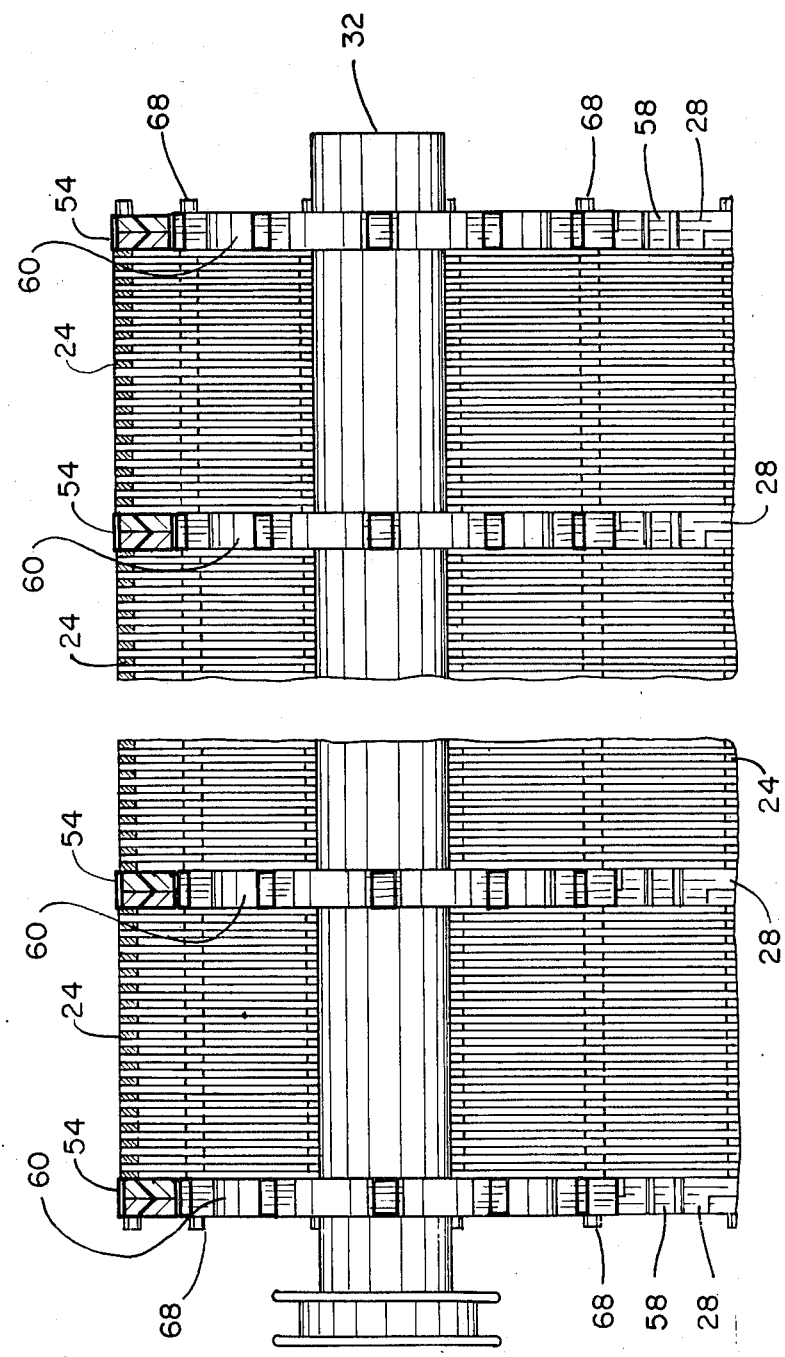
FIG. 11 is an elevation view of the gears and section view of a link and pivot member within interior of the housing.

The outer portion of drum chamber 14 contains a screen assembly 22. This screen assembly 22 is formed by multiple endless loop filter sections 50 mounted on rods 26. Each section 50 has a series of spaced apart adjacent loops 52 formed from links 24. The links 24 are connected together in an end-to-end relationship as shown in FIG. 4 by link connecting rods 26. Each filter section 50 is capped on each side by a gear tooth engaging pivot member 28.

The number of sections 50 in the assembly 22 can vary depending upon the size of the elongated drum chamber. A convenient number is six for handling a three foot diameter effluent flow.

The gear tooth engaging pivot member 28 has a flat bottom surface 54 and a top surface 56 containing a valley 58. A first end portion 60 and a second end portion 62 is located on each side of the valley 58. The end portions 60 and 62 each have an identical cut out 64 on a first side surface 70, and a second side surface 72 together with a through bore 66. The cut out 64 on each pivot member 28 engages a cooperating cut out 64 from an end-to-end mounted identical pivot member 28. The pivot members 28 are mounted on loop connecting rod 26 through bore 66. A nut 68 holds the pivot member in place on a section 50 that is located at the edge of the screen assembly 22. The pivot member 28 is made from a high strength polymer.

In the screen assembly 22, the bottom surface 54 of the pivot member 28 is distal from the center of chamber 14. The valley 58 is engaged by gear tooth 30 on gear 60 mounted in the top portion 21 of drum chamber 14.

Each pivot member 28 moves within a guide track 62 welded to the housing 10. Multiple gears 60 correspond in number to the endless loop filter sections 50. A shaft 32 connected to a variable speed motor 34 turns the gears 60.

A gear 30 engages each row of pivot members 28. Guide track 62 fits over the pivot members 28 and mounting bars 38 are mounted horizontally within the drum chamber 14 to support the assemblies 22.

Figure 2:
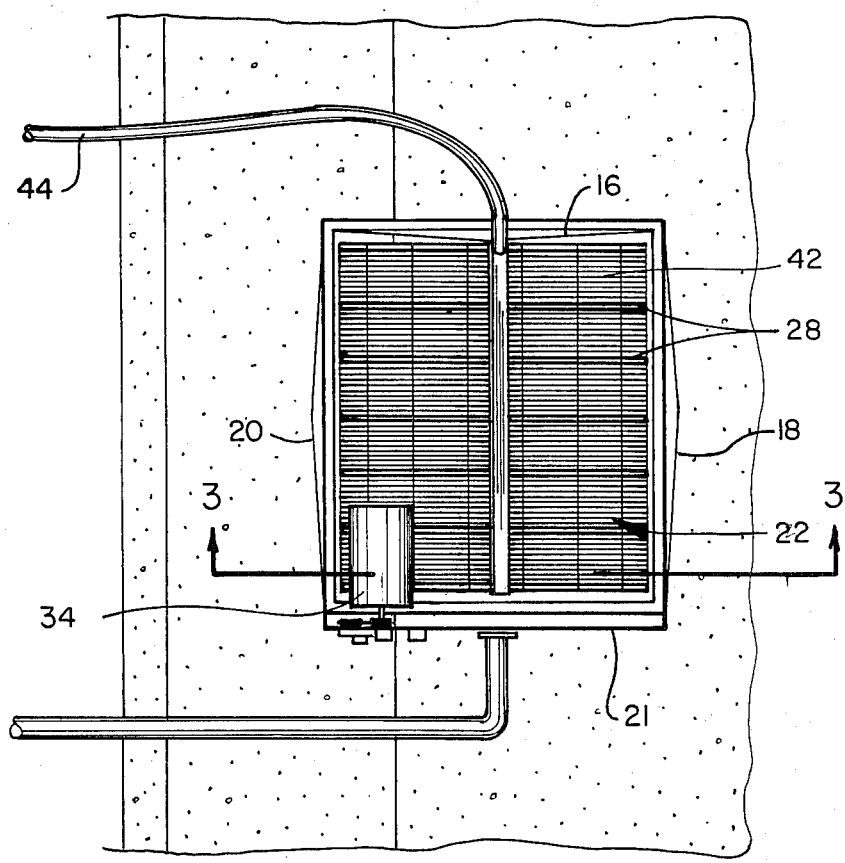
FIG. 2 is a top plan view of the drum chamber.
Figure 3:
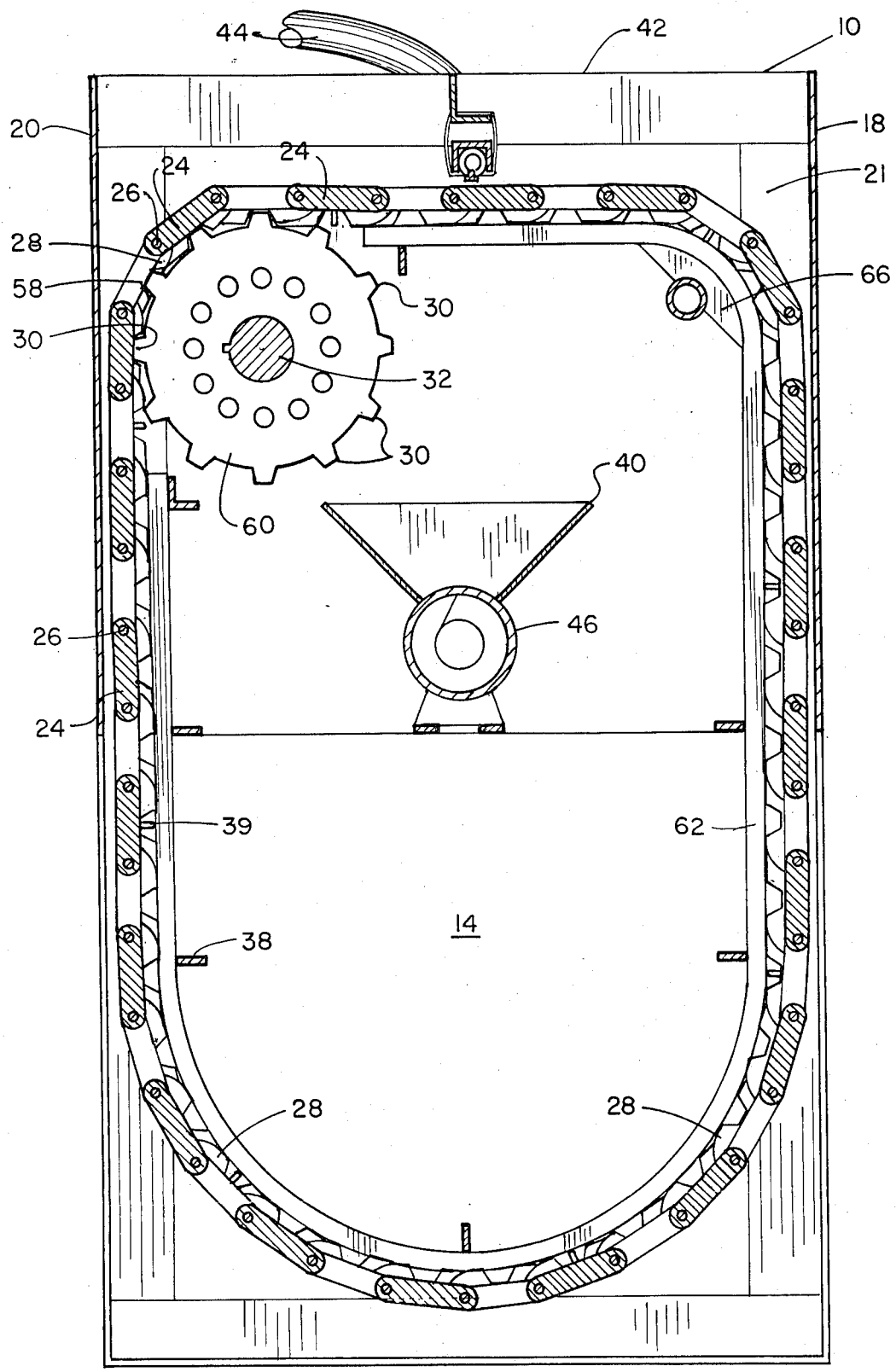
FIG. 3 is a front elevation view in section of the drum chamber.

Referring to FIG. 3 turning guides 66 are located at a point near the bottom and top of the chamber 14 to enable the pivoting members 28 to make a turn. A hopper 40 is mounted below the top portion 21 of chamber 14 and a hose 44 provides a continuous stream of water on top of the links 24 as they pass under the top 42 of the housing 10. The water pressure is sufficient to cause any debris collected between the links 24 to drop by gravity into the hopper 40. The water is separated from the debris by the compactor 46 and water falls down by gravity into the chamber 14. The bio-mass collected by the compactor 46 is carried by a pipe (shown in FIG. 2) to a central collecting point.

The housing 10 and elongated drum chamber 12 described herein will handle a flow channel three feet wide and three feet deep. Approximately 37,000 links 24 would be used in the described screen assembly 22. The links are less than 0.06 millimeters thick and usually are about 0.055 millimeters thick and can be coated with sharp sand or an epoxy polymer.

A spray head of about fifteen degrees on top of the housing 10 is adequate to dislodge debris from the links 24 passing beneath.

A speed of about 11.8 inches/minute of the screen assembly will adequately filter a water effluent moving through the elongated drum chamber 14 at 2.5 feet/second velocity.

Alternatively air can be pulsed between the links 24 passing under the top of housing 10 to dislodge the debris.

The links 24 and chamber 14 structure are made from stainless steel to retard rusting and all exterior surfaces of the housing are painted to protect the surfaces.

Having thus described the invention, what is claimed and secured by Letters patent is:

1. In an apparatus for removing fine particles from a water effluent using a drum type housing with a continuously rotating screen assembly moving in an eliptical path around a drum chamber receiving the water effluent and a flushing system on a top surface of the drum housing to carry away debris entrapped by the screen assembly, the improvement comprising,
    (a) the screen assembly having multiple endless loop filter sections, each section having a series of spaced apart adjacent loops, the loops containing end-to-end longitudinally mounted links, each link connected to another link by a horizontally mounted link connecting rod;
    (b) each filter section capped at each side by a gear tooth engaging pivot member, the pivot member having at least two lateral through bores to accommodate one of the horizontally mounted link connecting rods in each bore;
    (c) the pivot member having a flat bottom surface distal from a center of the drum chamber, a top surface having a valley intermediate a first and second end to accommodate a gear tooth, a first and second side surface having a cut out portion on the first end of the first side and a cut out portion on the second end of the second side to accommodate a matching cut out portion from a pivot member mounted end-to-end on the link connecting rod;
    (d) each link in the screen assembly having a width of less than 0.06 millimeters so that algae and other clumped microscopic debris will become entrapped between the links and washed off the links by the flushing system and
    (e) means for conveying debris to waste disposal.

2. An apparatus according to claim 1 wherein the links are coated with an synthetic coating.

3. An apparatus according to claim 1 wherein the drum housing has multiple gears driven by a variable speed motor mounted in an upper portion and the top surface of the pivot member engages teeth on the gears.

4. An apparatus according to claim 1 wherein the flushing system comprises a hose mounted on a top surface of the drum housing and water is directed on the filter sections as they pass beneath the hose.

5. An apparatus according to claim 1 wherein the links are stainless steel and the pivot member is a high strength polymer.

6. An apparatus for fine polishing a water effluent comprising:
   (a) a drum type housing having a continuously rotating screen assembly mounted within an interior portion of the housing;
   (b) a flushing device mounted on a top surface of the housing,
   (c) the housing having a front open entrance for receiving the water effluent and a back baffle wall together with open right and left lower side and bottom surfaces to permit water to exit after passing through the screen assembly;
   (d) the screen assembly having multiple endless loop filter sections, each section having a series of spaced apart adjacent loops, the loop containing end-to-end longitudinally mounted links, each link connected to another link by a horizontally mounted link connecting rod, each filter section capped at each side by a gear tooth engaging pivot member mounted on the connector rod, one surface of the gear tooth engaging pivot member engaging a gear tooth on a gear mounted on a motor driven shaft so that turning of the gear causes the screen assembly to rotate within the interior of the housing.

7. An apparatus according to claim 6 wherein the surface of the gear tooth engaging pivot member contacting the gear is the top surface, the top surface having a valley to accept the gear tooth, the pivot member having a cut out portion on a first and second side surface cooperatively engaging a like cut out portion from a end-to-end mounted pivot member.

8. An apparatus according to claim 7 wherein the links have a width of about 0.055 millimeters and the width determines the space between each adjacent link.

9. An appartus according wherein the pivot members are enclosed within a guide track mounted within the interior of the housing.

* * * * *